E. F. W. ALEXANDERSON.

ELECTRIC MOTOR.

APPLICATION FILED JAN. 12, 1907.

919,514. Patented Apr. 27, 1909.

WITNESSES:

Lester H. Fulmer.

J. Ellis Elen.

INVENTOR

ERNST F. W. ALEXANDERSON.

BY Albert G. Davis

ATT'Y.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

ELECTRIC MOTOR.

No. 919,514. Specification of Letters Patent. Patented April 27, 1909.

Application filed January 12, 1907. Serial No. 351,957.

*To all whom it may concern:*

Be it known that I, Ernst F. W. Alexanderson, a citizen of the United States, residing at Schenectady, county of Schenectady, State of New York, have invented certain new and useful Improvements in Electric Motors, of which the following is a specification.

My invention relates to electric motors of the commutator type, and its object is to provide a novel method of adapting such motors for operation on both direct and alternating-currents.

It is often desirable, as, for instance, in the case of an electric railway operating part of its line on direct, and part on alternating-current, to operate motors on either kind of current; and as is well known in the art, satisfactory operation with both kinds of current is not easy to secure. Certain characteristics of the motor vary when changed from direct to alternating-current, or vice versa, so that a motor which operates excellently on direct-current is not necessarily satisfactory for alternating-current operation. One of these characteristics is the less satisfactory commutation on alternating-current operation, due to the currents induced by the alternating field in the coils short-circuited by the brushes. Another characteristic is the difference in field-strength required for operation on the two kinds of current. On account of the self-induction of the field when operated on alternating-current, it is undesirable to employ as many field turns as are advantageous for direct-current operation.

My invention consists in taking advantage of each of the above characteristics to neutralize the other,—or more specifically stated, in employing a portion of the coils which for direct-current are used to produce the main field for producing a commutating field for alternating-current operation.

My invention further comprises certain arrangements and connections of the field coils for facilitating the method of control outlined above.

My invention will best be understood by reference to the accompanying drawings, in which—

Figure 1:
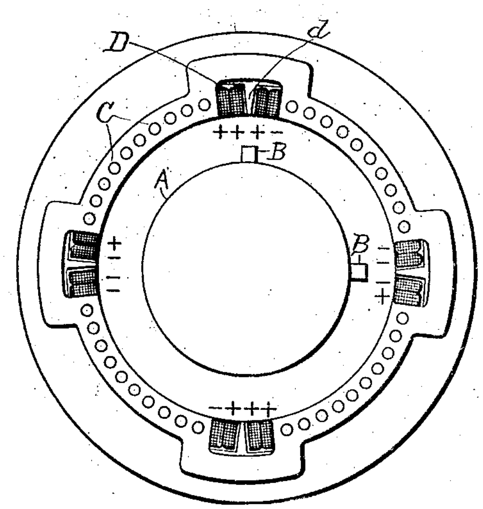
Figure 2:
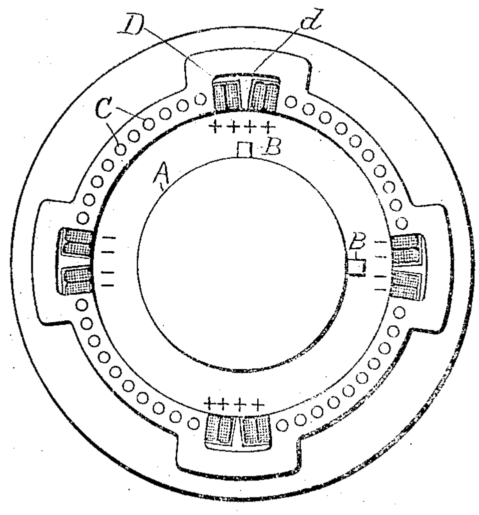
Figure 3:
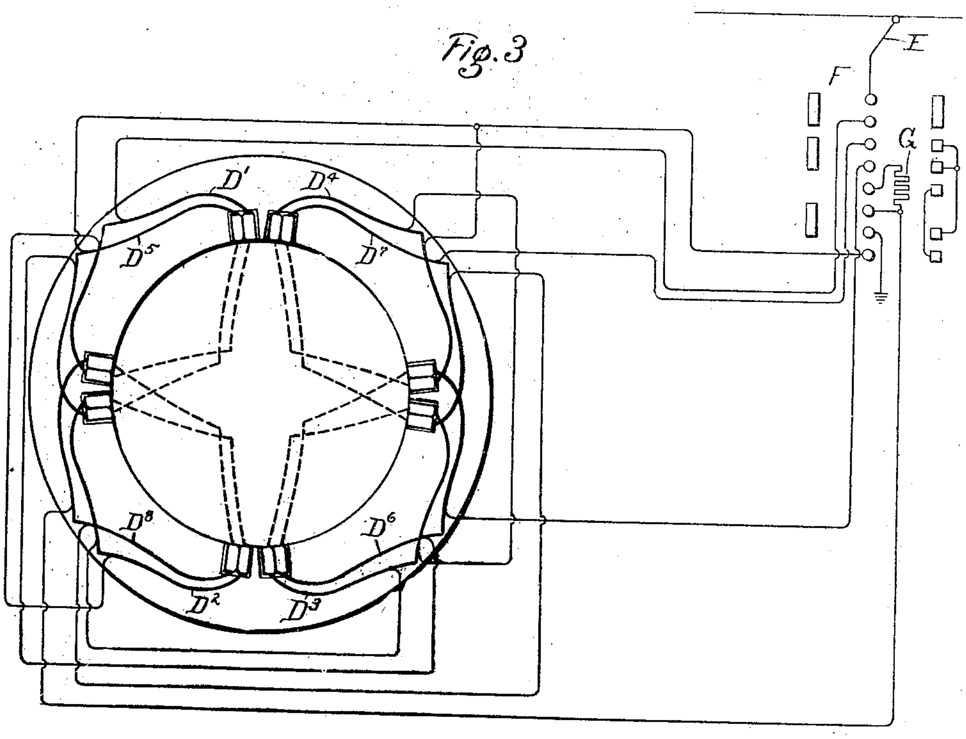

Figures 1 and 2 are explanatory diagrams, and Fig. 3 shows diagrammatically a field winding of a motor and commutating switch therefor adapted for carrying out my method of control in a simple manner.

Referring first to Figs. 1 and 2, A represents the armature, and B the brushes of a motor of the commutator type. C represents a distributed compensating winding carried on the field structure. I have chosen to illustrate this winding as composed of single conductors short-circuited by end-rings. This is one well known arrangement of compensating winding, and, as is well understood in the art, this winding is effective only for alternating-current operation. If the winding is formed of coils connected in series with the armature, it is effective for both alternating and direct-current operation; but ordinarily, such a winding is not required for direct-current, and the type of winding illustrated is simpler. D represents the main field coils of the motor. I have shown a plurality of coils, the coils of adjacent poles being separated by a tooth or lug *d*, which serves as a commutating pole for alternating-current operation.

If the relative directions of current in the conductors of the field coils in the several slots for direct-current operation be considered, it will be seen that these directions will be as indicated by the plus and minus signs in Fig. 2. The direction of current-flow in all the coil conductors in each slot is the same, so that all the coils assist in producing the main field, and no magnetization of the lugs *d* is produced. If it is desired to produce a commutating field in the lugs *d*, this may be accomplished by reversing the direction of flow in a portion of the coil conductors on one side of each lug, as indicated by the plus and minus signs in Fig. 1. In this figure the coil conductors which lie adjacent to the tooth *d* produce the main field, as in Fig. 2, while the coil conductors more remote from the tooth produce a magnetization of the tooth, which, if of the proper amount and phase may serve as a commutating field. For alternating-current operation this commutating field is highly desirable, while for direct-current operation it is not necessary. On the other hand, while all the field coils are required for the main magnetization for most satisfactory direct-current operation, it is not desirable to use all these coils for the main magnetization in alternating-current operation, so that a portion of the coils may be used with advantage for producing the commutating field. Consequently, if the relative directions of current-flow in the coil conductors are changed, as indicated by the plus and minus signs in Figs. 1 and 2, respectively, when changing from alternating to direct-current, the requirements for satisfactory operation with each kind of current, both with respect to the commutating field and the number of main field turns, are satisfied.

In order to make the necessary change for producing the relative reversal of current-flow in a portion of the field coils, the field coils should be properly arranged and connected. By comparing the coil conductors in the upper slots in Figs. 1 and 2, it will be seen that the right-hand coil conductors alone are relatively reversed, and comparing the coil conductors in the right-hand slots in these figures, it will be seen that the lowest conductors alone are reversed. Consequently, the right-hand conductors in the upper slot may be connected to the lowest conductors in the right-hand slot to form a single coil, as indicated by the coil $D^7$ in Fig. 3. Similarly, the upper coil conductors in the left-hand slot may be connected with the left-hand conductors in the lower slot to form another coil $D^8$. The remaining coil conductors may then be connected to form the remaining coils $D^1$ to $D^6$.

In Fig. 3 I have shown a switch suitably arranged for making the necessary changes in connections when shifting from direct to alternating-current, and vice versa. In this figure E represents the trolley or current-collector, which may at times be connected to a source of direct-current, and the others to a source of alternating-current. F represents a commutating switch, which is reversed in position in passing from an alternating-current section to a direct-current section, or vice versa. D represents the main field coils. For direct-current operation, the left-hand movable contacts of switch F are brought into engagement with the stationary contact-fingers, and a circuit is then completed, which may readily be traced through coils $D^1$, $D^2$, $D^3$, $D^4$, $D^5$, $D^6$, $D^7$ and $D^8$, all in series, to ground. When switch F is moved to its other position, one terminal of coil $D^7$ is left connected to coil $D^6$. Coils $D^7$ and $D^8$ are left connected to each other; the other terminal of coil $D^8$ being connected to the junction of coils $D^4$ and $D^5$, the junction of coils $D^6$ and $D^7$ being now connected to ground. Consequently, coils $D^7$ and $D^8$ are connected in parallel with coils $D^5$ and $D^6$, but the relative direction of current-flow through coils $D^7$ and $D^8$ is reversed with respect to the other six coils. The relative reversal of the direction of coils $D^7$ and $D^8$ produces the magnetization of the commutating lugs, while the parallel connection with coils $D^5$ and $D^6$ is for the purpose of securing in a simple manner, the proper phase of the commutating field. When the parallel connection is made, the non-inductive resistance G is connected in series with the coils $D^7$ and $D^8$, thereby producing a phase-displacement between the current in the coils $D^7$ and $D^8$, on the one hand, and the current in the coils $D^5$ and $D^6$, on the other. By properly proportioning the resistance G, this phase-displacement may be made of the proper amount for producing the desired phase of the commutating field.

In Fig. 3, in order to simplify the drawing, the armature connections have been entirely omitted. It will be understood that in the case of a series motor, the armature would be connected in series with the field circuit established by the commutating switch F.

In order to produce the relative reversal of current in the proper coil conductors, in forming the coils certain of the coils may overlap certain others at one end. By "overlap" I mean that these coils should extend to the far side of one of the adjacent commutating lugs. Thus, in Fig. 3 the coils $D^7$ and $D^6$ overlap at one end, while the coils $D^8$ and $D^5$ similarly overlap.

I do not desire to limit myself to the particular construction and arrangement of parts here shown, but aim in the appended claims to cover all modifications which are within the scope of my invention.

What I claim as new and desire to secure by Letters Patent of the United States, is,—

1. The method of operating a motor of the commutator type on both alternating and direct-current, which consists in connecting all the field coils to assist in producing the main field magnetization for operation on direct-current, and for alternating-current operation employing a portion of said field coils for producing a commutating field.

2. The method of operating a motor of the commutator type on both alternating and direct-current, which consists in employing a portion of the field winding to produce a commutating field for alternating-current operation, and employing said portion to assist in producing the main field magnetization for direct-current operation.

3. In combination, a motor of the commutator type having a plurality of field coils per pole, a portion of said coils overlapping other coils at one side thereof, and a switch for reversing the relative direction of current flow in a portion of said field coils.

4. In combination, a motor of the commutator type having a plurality of field coils per pole, a portion of said coils overlapping other coils at one side thereof, and a switch for reversing the relative direction of current-flow in one-half of said overlapping coils.

5. In combination, a motor of the commutator type having a plurality of field coils per pole, a magnetic tooth or lug separating the field coils of adjacent poles, and a switch for reversing the relative direction of current-flow in a portion of the coil conductors on one side of said lug to produce therein a commutating field.

6. In combination, a motor of the commutator type having a plurality of field coils per pole, a magnetic tooth or lug separating the field coils of adjacent poles, a portion of said coils overlapping each other and having one side lying on the far side of one of the adjacent teeth, and a switch for reversing the relative direction of current-flow in a portion of said overlapping coils.

7. In combination, a motor of the commutator type having a plurality of field coils per pole, a portion of said coils overlapping other coils at one side thereof, and a switch for reversing the relative direction of current-flow in one-half of said overlapping coils and connecting them in parallel with the other half.

8. In combination, a motor of the commutator type having a plurality of field coils per pole, a portion of said coils overlapping other coils at one side thereof, a switch for reversing the relative direction of current-flow in one-half of said overlapping coils and connecting them in parallel with the other half, and means for controlling the relative phases of the currents in the parallel-connected coils.

9. In combination, a motor of the commutator type having a plurality of field coils per pole, a magnetic tooth or lug separating the field coils of adjacent poles, a switch for reversing the relative direction of current-flow in a portion of the coil conductors on one side of said lug to produce therein a commutating field, and means for controlling the relative phase of the relatively-reversed current.

10. In combination with a motor of the commutator type, means for supplying either direct or alternating-current thereto, and means for connecting a portion of the main field winding to produce a commutating field when changing from direct to alternating-current.

11. In combination with a motor of the commutator type, means for supplying either direct or alternating-current thereto, means for connecting a portion of the main field winding to produce a commutating field when changing from direct to alternating-current, and means for controlling the phase of the commutating field.

In witness whereof, I have hereunto set my hand this 10th day of January, 1907.

ERNST F. W. ALEXANDERSON.

Witnesses:
BENJAMIN B. HULL,
HELEN ORFORD.